(12) United States Patent
Bryant et al.

(10) Patent No.: US 7,844,415 B1
(45) Date of Patent: Nov. 30, 2010

(54) DYNAMIC MOTION COMPENSATION FOR ORIENTATION INSTRUMENTATION

(75) Inventors: Tyler M. Bryant, Santa Rosa, CA (US); Davy J. Figaro, Sebastopol, CA (US); Andrew T. Taylor, Santa Rosa, CA (US)

(73) Assignee: PNI Corporation, Santa Rosa, CA (US)

( * ) Notice: Subject to any disclaimer, the term of this patent is extended or adjusted under 35 U.S.C. 154(b) by 335 days.

(21) Appl. No.: 12/017,161

(22) Filed: Jan. 21, 2008

Related U.S. Application Data

(60) Provisional application No. 60/956,907, filed on Aug. 20, 2007.

(51) Int. Cl.
*G01P 15/105* (2006.01)
*G06F 17/16* (2006.01)

(52) U.S. Cl. ............... 702/151; 702/141; 702/150; 702/153; 73/488; 73/514.16

(58) Field of Classification Search .......... 702/151, 702/141, 150, 153
See application file for complete search history.

(56) References Cited

U.S. PATENT DOCUMENTS

| | | | |
|---|---|---|---|
| 6,285,927 B1 | 9/2001 | Li | |
| 6,289,268 B1 | 9/2001 | Didinsky | |
| 6,335,617 B1 | 1/2002 | Osadchy | |
| 6,725,173 B2 * | 4/2004 | An et al. | 702/141 |
| 6,842,991 B2 | 1/2005 | Levi | |
| 6,931,323 B2 | 8/2005 | Choi | |
| 7,155,837 B2 | 1/2007 | Cho | |
| 7,295,943 B2 * | 11/2007 | Cho et al. | 702/95 |
| 7,451,549 B1 * | 11/2008 | Sodhi et al. | 33/356 |
| 2002/0103610 A1 * | 8/2002 | Bachmann et al. | 702/94 |
| 2002/0171427 A1 * | 11/2002 | Wiegert et al. | 324/345 |
| 2003/0158699 A1 * | 8/2003 | Townsend et al. | 702/151 |
| 2004/0017192 A1 | 1/2004 | Clymer | |

OTHER PUBLICATIONS

Caruso, Michael J.; "Applications of Magnetic Sensors for Low Cost Compass Systems"; Honeywell, SSEC; www.ssec.honeywell.com/magnetic/datasheets/lowcost.pdf [Apr. 26, 2010], 8 pages.

Cho, Seong Yun; "Tilt compensation algorithm for 2-axis magnetic compass"; Electronics Letters, Oct. 30, 2003, vol. 39, No. 22, 2 pages.

Cho, Seong Yun; "A Calibration Technique for a Two-axis Magnetic Compass in Telematic Devices"; ETRI Journal, vol. 27, Nbr. 3; Jun. 2005, pp. 280-288.

\* cited by examiner

*Primary Examiner*—Hal D Wachsman
(74) *Attorney, Agent, or Firm*—Fernandez & Associates, LLP (57) ABSTRACT

The instant invention discloses a method for an orientation measuring instrument to isolate and separate gravitational and non-gravitational components of acceleration from accelerometer measurements by using an ambient magnetic field, typically the earth's magnetic field, as a fixed rotation reference. Using magnetic field measurements, one can track changes in orientation of a device and use that information to determine the gravitation direction, during periods when acceleration measurements include non-gravitational acceleration combined with gravitational acceleration components. In addition to determining orientation, a method and associated instrument provide a non-gravity acceleration vector of the device.

17 Claims, 8 Drawing Sheets

Figure 1
Rotation of G & Be through same angle around x-axis without motion corruption.

Figure 2a Vector orientation during rotation around z-axis using erroneous direct rotation axis (perspective)

Figure 2b (top view)

Figure 2c (perspective)
Vector orientation during rotation around z-axis using correct rotation axis.

Figure 2d (top view)

Figure 3a
Three magnetic field points during a rotation around z-axis (perspective view)

Figure 3b (top view)

Figure 4a
Rotation around Bearth, Be, showing no change in Bearth

Figure 4b
Dead zone around Be – rotation axis within dead zone causes errors.

Figure 5
Interpolation to attain consistent timing.

| Parameter | Measurement 1 | | | | | | | | | | | | Measurement 2 | | | | | | | | | | | |
|---|---|---|---|---|---|---|---|---|---|---|---|---|---|---|---|---|---|---|---|---|---|---|---|---|
| Ax | | | | | | | | | | | | | | | | | | | | | | | | |
| Mx | | | | | | | | | | | | | | | | | | | | | | | | |
| Ay | | | | | | | | | | | | | | | | | | | | | | | | |
| My | | | | | | | | | | | | | | | | | | | | | | | | |
| Az | | | | | | | | | | | | | | | | | | | | | | | | |
| Mz | | | | | | | | | | | | | | | | | | | | | | | | |
| Time --> | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

​           ^                                    ^
       Ref Time                           Ref Time

DYNAMIC MOTION COMPENSATION FOR ORIENTATION INSTRUMENTATION

PRIORITY

Applicant claims priority from U.S. Provisional application Ser. No. 60/956,907 filed on Aug. 20, 2007.

CROSS-REFERENCE TO RELATED APPLICATIONS

The prior art for the present invention is found in U.S. Pat. No. 4,851,775, U.S. Pat. No. 5,239,264, U.S. Pat. No. 5,381,603, U.S. Pat. No. 6,243,660, U.S. Pat. No. 6,549,145, U.S. Pat. No. 7,451,549, filed on Aug. 9, 2006 and U.S. Provisional application Ser. No. 60/956,907 filed on Aug. 20, 2007. Disclosure from these patents and applications is incorporated by reference and included herein in their entirety.

BACKGROUND OF THE INVENTION

1. Field of the Invention

The invention relates generally to the determination of orientation through sensing Earth's magnetic field, and more particularly to a method and apparatus to correct compass magnetic heading and/or position sensing indications to account for motion and/or magnetic distortions.

2. Description of Related Art Including Information Disclosed Under 37 CFR 1.97 and 1.98

Orientation instrumentation often uses acceleration or tilt sensors to determine the tilt angle relative to earth horizontal reference. Most of these tilt sensors are sensitive to motion acceleration, distinct from the acceleration of gravity, which can result in large orientation errors during periods of movement. The orientation error is directly seen in pitch and roll errors, as well as indirectly seen in yaw errors.

One means of compensating for motion induced orientation errors which has been previously employed is the use of the gyroscopic effect to monitor rotation rates and correct for the motion induced errors, since gyros are not generally subject to the same errors. This method has the disadvantage in practice that accurate and stable gyros tend to be large, expensive, and have relatively large power requirements. Inexpensive gyros tend to have high drift rates, limiting their usefulness to short duration motions. In either case, gyros add additional complexity to an orientation system.

Previous patents cover various methods of integrating gyros into compassing and orientation applications, such as U.S. Pat. No. 6,842,991 by Robert Levi and Robert Marshall, issued 18 Jan. 2005. Clymer Technologies disclosed U.S. 2004/0017192, now abandoned, as an orientation sensor with four magnetic sensors and a method for calculating magnetic inclination. U.S. Pat. No. 6,842,991 and U.S. 2004/0017192 are incorporated by reference herein in their entirety.

Clymer Technologies' Terrella6™ offers a heading and motion sensor capable of determining roll, pitch, yaw, translational accelerations, angular rates, and compass heading. The sealed device contains no moving parts and has interference detection to reduce ferrous metal disturbances.

The method disclosed by the instant invention makes use of an ambient magnetic field as a rotation reference during periods of motion.

BRIEF SUMMARY OF THE INVENTION

Orientation instrumentation often uses acceleration or tilt sensors to determine the tilt angle relative to earth horizontal reference. Most tilt sensors are sensitive to motion acceleration distinct from the acceleration of gravity, which can result in large orientation errors during periods of movement. The instant invention discloses a method for isolating and calculating gravitational and non-gravitational components of acceleration from accelerometer measurements by using an ambient magnetic field, typically the earth's magnetic field, as a fixed rotation reference. Using magnetic field measurements, one can track changes in orientation of a device and use that information to accurately determine the direction of gravitation, even during periods when acceleration measurements include non-gravitational acceleration combined with gravitational acceleration components. In addition to accurately determining orientation, a method provides a non-gravity acceleration vector of the device. This non-gravity acceleration vector can then be used for a variety of applications including, but not limited to, inertial navigation (dead-reckoning), position determination, gesture based controllers, video game/computer interfaces, and autonomous vehicle control.

In a tilt-compensated compass, the instant invention provides a solution to motion induced orientation errors by correcting a tilt reading during periods of movement and calculating a tilt compensated heading reading, thus giving accurate orientation readings. Using a local magnetic field provides an independent rotation reference without the expense and limitations of one primary alternative, gyroscope integration.

SYMBOLS

B earth magnetic field vector

G vector acceleration of gravity, parallel to the down vector in the earth coordinate system, pointed to the center of the earth $\vec{n}$ North direction vector of earth coordinate system, pointed in the direction of the magnetic North Pole in the local horizontal plane.

$\vec{e}$ East direction vector of earth's coordinate system, pointed in an easterly direction in the local horizontal plane.

i Inclination or dip angle p Pitch angle r Roll angle y yaw angle or heading angle X compass orientation of magnetic component in X direction Y compass orientation of magnetic component in Y direction Z compass orientation of magnetic component in Z direction Ra the rotation axis around which the device has rotated gamma, γ, the angle about Ra which the device has rotated Gi known good accelerometer readings gx, gy, gz without substantive motion distortions.

Bei=magnetometer readings bex, bey, bez taken at the same time as Gi.

Gest Final best estimate for the true G

Gesti Estimate of G based on rotation of Be from the time of the initial "good" reading of G.

Coefficients am (a0, a1 . . . )

Gestg Estimate of current G based on dynamic analysis of G history Coefficient b is weighted according to how good Gestg is considered relative to the other equation inputs.

cm Weighted coefficients for most recent G readings.

dm Weighted coefficients for most recent Gest outputs.

am weight Gestim based

NGA Non-Gravity Acceleration vector

NGAcalc Calculated Non-Gravity Acceleration vector

Bmeas Vector of magnetometer measurements

Bdist Vector of magnetic distortions

Gmeas Vector of linear acceleration measurements, as measured

Gmagest Vector estimate of $\vec{g}$ based on Magnetometer measurements

Gaccest Vector estimate of $\vec{g}$ based on Accelerometer measurements

Gacc_conf Confidence of the quality of Gaccest

Gmag_conf Confidence of the quality of Gmagest

Gest Final vector estimate of $\vec{g}$ obtained by combining Gmagest with Gaccest

DETAILED DESCRIPTION OF THE INVENTION

Motion Compensation

In one embodiment, a tilt compensated compass comprises at least two and optionally, three magnetic sensors (x, y, z) and at least one and optionally, two or three accelerometer sensors (x, y, z). When the compass is not being accelerated, accelerometers provide an accurate reference of horizontal for determining a north component of the earth's local magnetic field. Upon moving a tilt compensated compass, accelerometer readings include a motion induced component in addition to an earth gravity component, resulting in orientation error. However, if a tilt compensated compass traces the path of a three dimensional, 3D, earth magnetic field vector (B), a tilt compensated compass can sense and track the direction and magnitude of the rotation which has occurred since the last measurement. Sensing a rotation recorded by B, a tilt compensated compass can use this to isolate the non-gravity accelerations (NGA) and the gravitational vector (G) from one or more accelerometer measurements (Gmeas).

$$NGA+G=Gmeas \quad (1)$$

Lateral Acceleration

Consider the case of a tilt compensated compass undergoing lateral acceleration. The orientation is not changing, so real tilt and yaw remain unchanged, but accelerometer readings cause the tilt readings to change. Because no rotation has occurred, the 3D B vector remains unchanged. Therefore one can infer that the tilt is unchanged and ignore the corrupted tilt indication.

Pitch & Roll Acceleration

Figure 1:
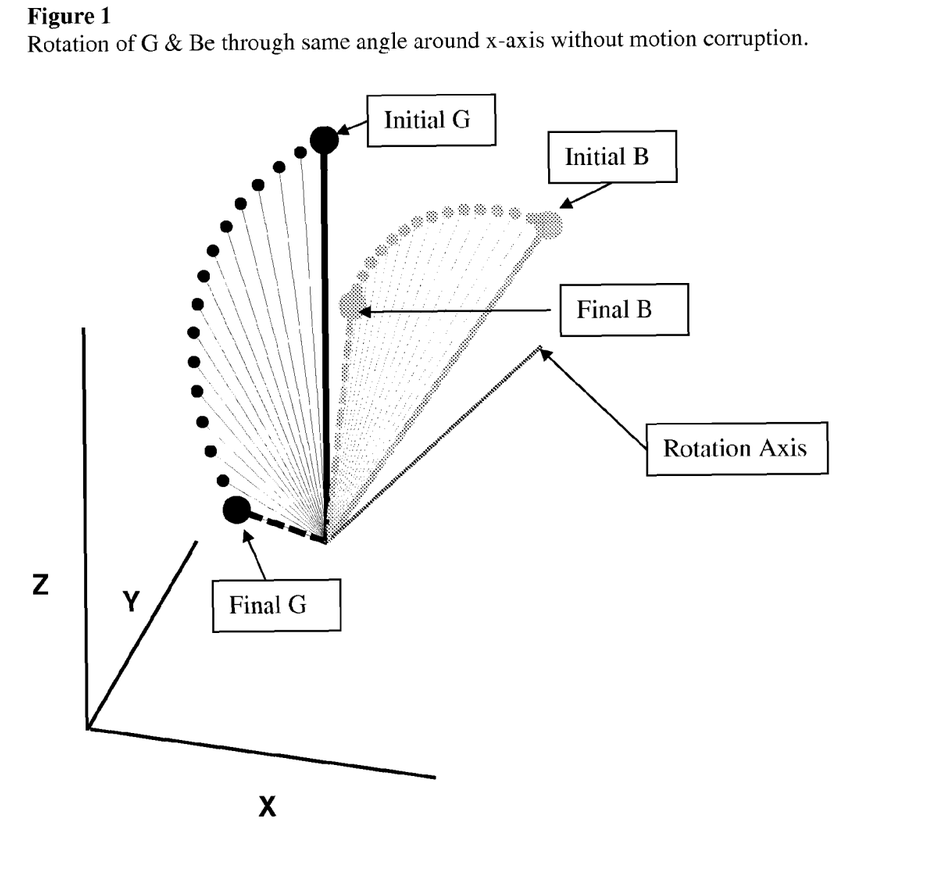
FIG. 1 Rotation of G & B through same angle around arbitrary axis without motion corruption.
Figure 6:
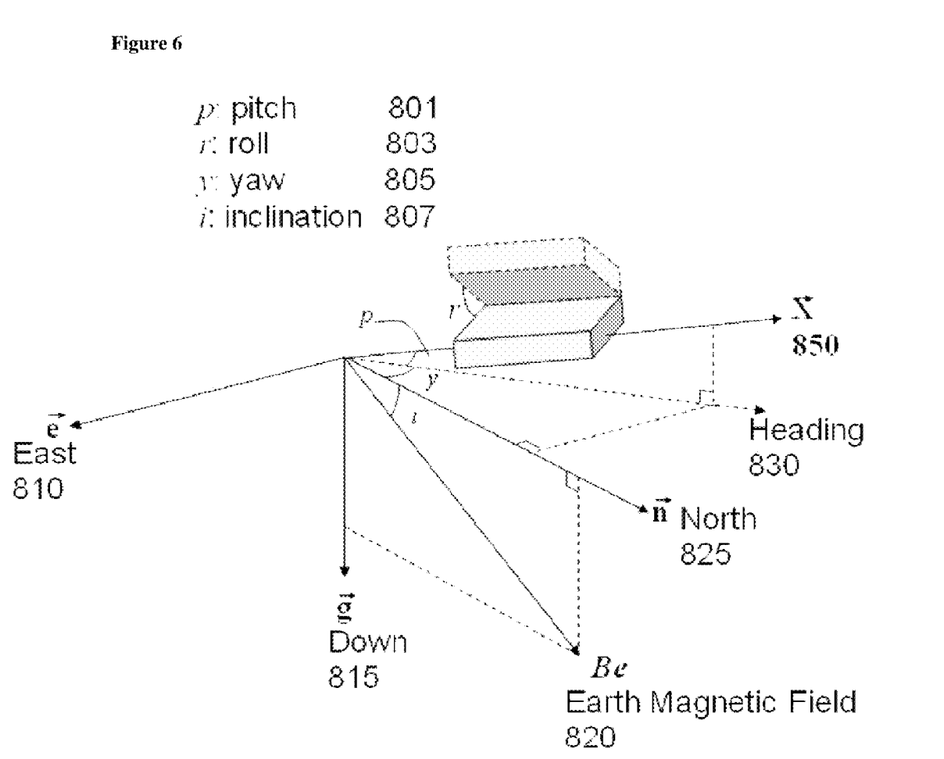
FIG. 6 Relationship of pitch, roll, yaw and inclination.

In the case of a pitch & roll motion, B serves as a tilt reference which is not affected by acceleration. FIG. 1 shows roll rotation about a x-axis and resulting identical B & G rotation changes. A simple pitch or roll motion is captured or sensed by sensing the rotation of B. Therefore when an initial static tilt is known, then monitoring the magnetic field B enables tracking of subsequent tilt positions, even if the acceleration measurement (Gmeas) is corrupted by a non-gravity acceleration (NGA). The earth magnetic field vector B serves as a valid tilt reference in the case of a lateral acceleration as well as for a specific rotation, such as around the x-axis. In general a pitch or roll motion can be calculated by sensing the rotation of the B vector, except in the case where the rotation axis is B itself. This exceptional case of rotation about the B axis is addressed later; aside from this specific case it can be stated that if a starting static tilt is known, then the magnetic field B tracks subsequent tilt positions, even during acceleration. FIG. 6 shows the relationship of pitch, roll, yaw and inclination and other vectors of interest.

Tracking the Rotation Axis

Figure 2A:
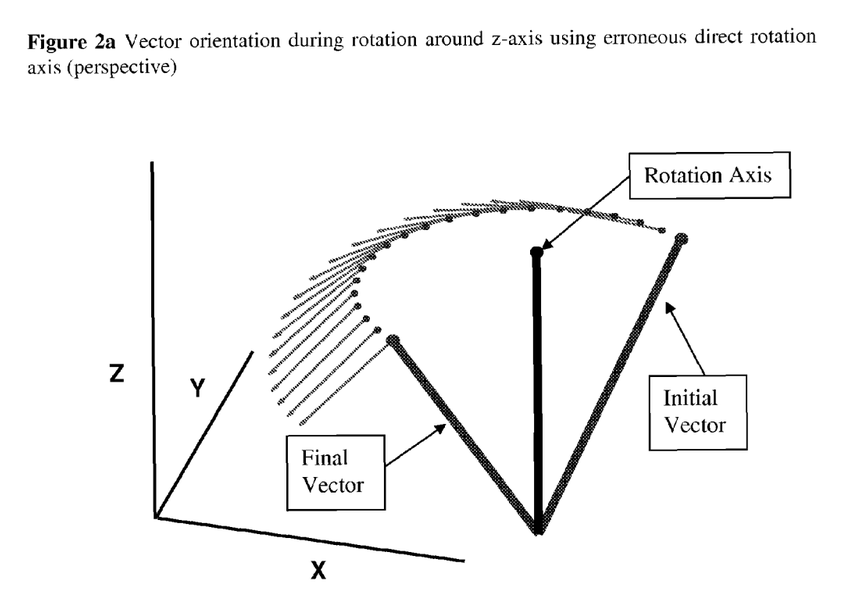
FIGS. 2a and 2b Vector orientation during rotation around z-axis using erroneous direct rotation axis.
Figure 2B:
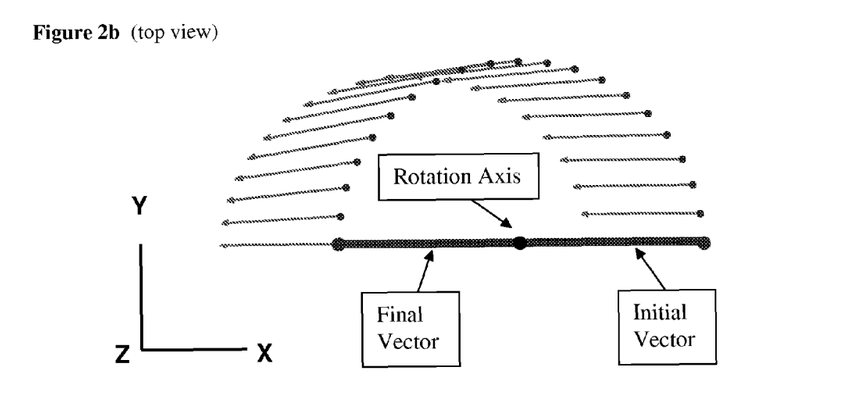
Figure 2C:
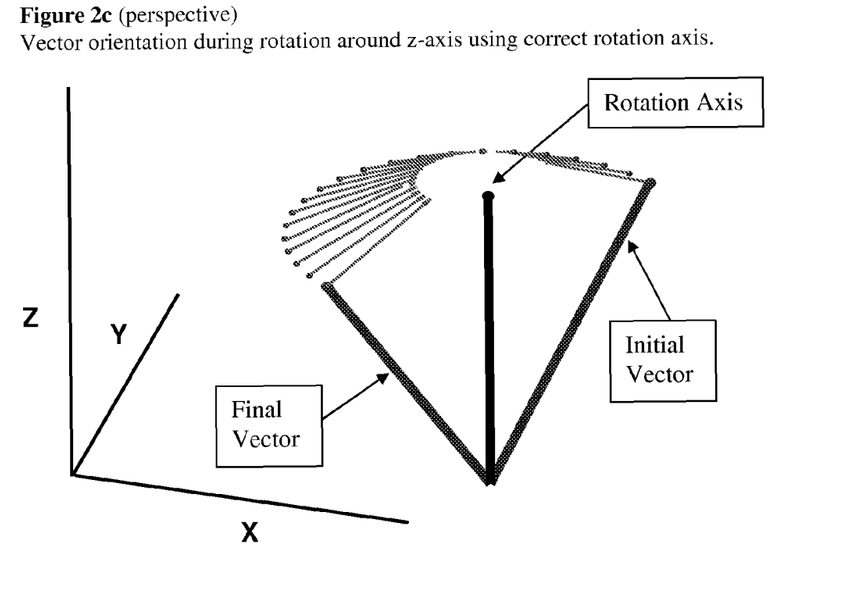
FIGS. 2c and 2d Vector orientation during rotation around z-axis using correct rotation axis.
Figure 2D:
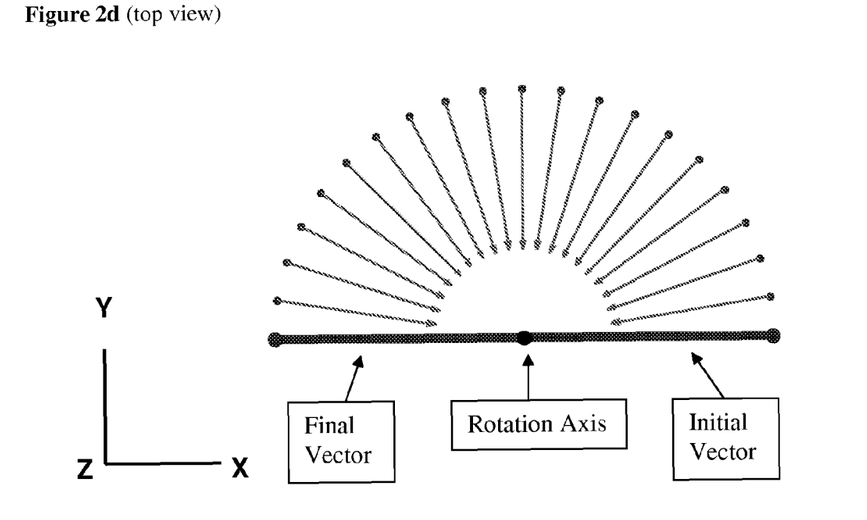

One difficulty in implementing an algorithm is to find the axis of rotation among magnetometer readings. A direct rotation, assuming a rotation axis which is orthogonal to both the first and second B field vector components will not necessarily be the correct axis, and will not account for rotation motion around the B field. FIG. 2a shows a rotation of a device around a z-axis where the vector orientation is calculated as an erroneous direct rotation. FIG. 2b shows the same rotation using the correct axis of rotation (the z-axis), which preserves the correct orientation information of the B vector (rotation around the B field).

Figure 3A:
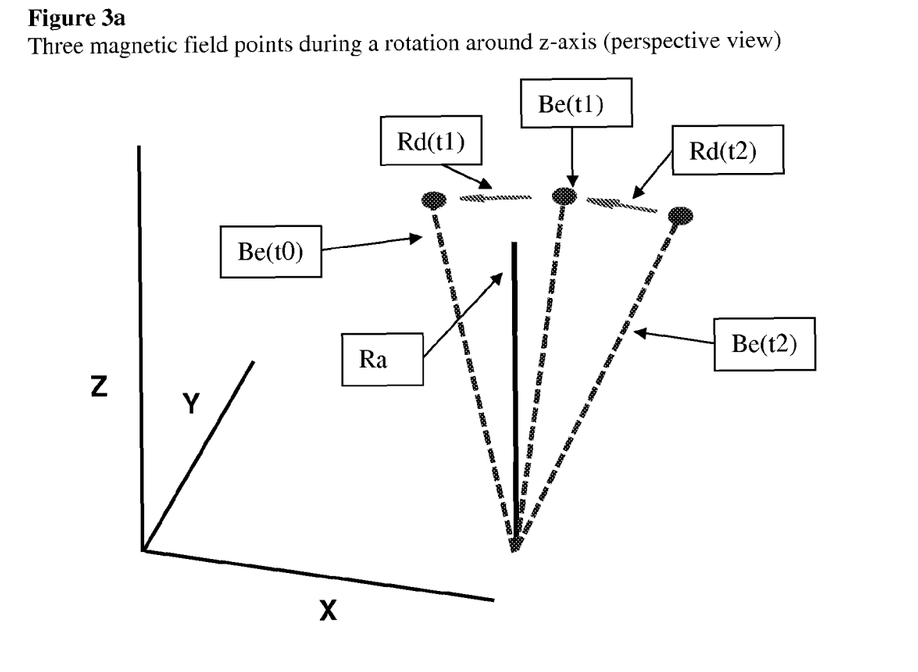
FIGS. 3a and 3b Three magnetic field points during a rotation around z-axis.
Figure 3B:
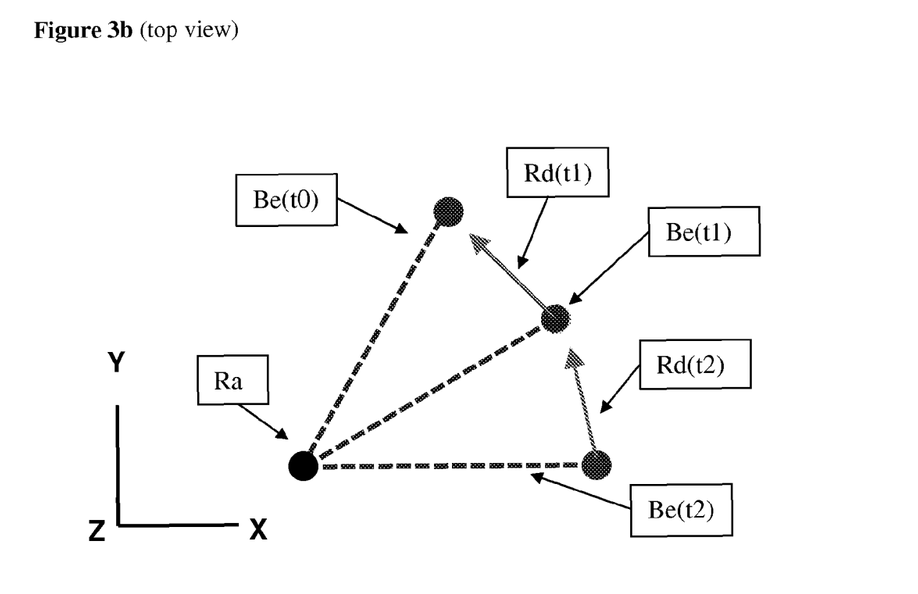

One implementation for finding the correct axis of rotation is to use a series of measurement points to track the motion of the magnetic vector. For instance, a series of three measurement points resulting from a rotation around the z-axis is shown in FIGS. 3a and 3b, with t0 representing the most recent measurement, and increasing t (t1, t2) representing earlier measurements. In the limit of small rotations (and as delta t goes to 0) the difference vector (Rd[t1]) between adjacent B vectors B[t0] and B[t1] will be pointing in the same direction as a normal to the plane defined by B[t1] and the axis of rotation (Ra) between B[t0] and B[t1].

Thus, in the limit of small rotations, Rd becomes Rn, the normal to a rotating plane defined by B and Ra. Once Rn is known on two adjacent rotation segments, Ra can be calculated directly as the cross product between the two vectors:

$$Ra[t1]=Rn[t2]\times Rn[t1] \text{ [where x=cross product]} \quad (2)$$

In the case where rotations are not necessarily small, but where the rotation axis Ra is fixed, then Rd will not in general equal Rn, yet the rotation axis can still be determined by two adjacent Rd's, representing three B measurements:

$$Ra[t1]=Rd[t2]\times Rd[t1] \quad (3)$$

The angle to rotate (gamma) can be calculated as:

$$gamma=a\cos(dot(Rdn[t2],Rdn[t1])) \quad (4)$$

where Rdn is normalized Rd:

$$Rdn=Rd/magnitude(Rd) \quad (5)$$

Gamma is defined as the angle through which B[t2] needs to rotate around the axis Ra to meet B[t1]. And the corresponding rotation matrix:

$$Tr[t1] = \text{rotation matrix}(Ra[t1], \text{gamma}) \quad (6)$$

Tr[t1] is defined as the rotation matrix for rotation of angle gamma about axis Ra.

Starting out with an initial set of magnetometer readings and a set of accelerometer readings without non-gravity acceleration distortions:

Gi=known good accelerometer readings without substantive motion distortions.

Bi=magnetometer readings taken at the same time as Gi.

Subsequent to initial good readings, a motion involving any arbitrary linear acceleration as well as a rotation around a fixed axis distorts the next series of accelerometer readings. The accelerometer measurement (Gmeas) is not used directly as G for tilt and heading calculations. Instead, an estimated G vector called Gesti, is calculated from an initial Gi and a series of Ra, gamma rotations are calculated from a series of B readings.

For a rotation on a fixed axis over 3 B readings (see FIGS. 3a and 3b):

$$Rd[t1] = B[t0] - B[t1]; Rd[t2] = B[t1] - B[t2] \quad (7)$$

$$Ra[t1] = Rd[t2] \times Rd[t1] \quad (8)$$

$$\text{Gamma}[t1] = a\cos(\text{dot}(Rdn[t2], Rdn[t1])) \quad (9)$$

$$Tri[t1] = \text{rotation matrix}(Ra[t1], \text{Gamma}[t1]) = \text{rotation matrix for rotation of } B[t2] \text{ to } B[t1] \quad (10)$$

Update the estimated accelerometer vector based on Tri rotation:

$$Gesti[t1] = Tri[t1] \cdot Gi \quad (11)$$

This series of steps is repeated with each new B reading, and assuming the rotation axis Ra is approximately fixed for the most recent 3 readings, then the estimate Gesti will approximate an accurate tilt reference.

For each new B reading Gesti is updated:

$$Gesti[tn] = Tri[tn] \cdot Gesti[tn-1] \quad (12)$$

Errors in the approximation may accumulate over time, so that eventually it will be necessary to reset Gesti with a new known good Gi. Over what time period errors accumulate depends on several factors, including update rate, rate of change of the rotation axis, Ra, and magnetic sensor measurement noise.

Cross-Weighted Calculation of Ra

One cause of accumulated errors involves noisy measurements combined with a small rotation delta Rd, where Rd is on a similar order as the noise, resulting in large errors in the direction of the rotation axis Ra. One solution involves tracking Ra over time to provide weighting and smoothing to the determination of the rotation axis. Adding a series of cross products Rd[t]×Rd[t−1] from t=t1 all the way back to some depth, or time, tn, gives a weighted average of all the individual Ra's from t=t1 to t=tn−1, with depth n, where the weighting depends on the magnitudes of the individual Rd's and the sine of the angles between them. Thus larger movements (larger Rd's) have greater weighting, which is a desired result.

$$Ra[t1] = (Rd[t2] \times Rd[t1] + Rd[t3] \times Rd[t2] + \ldots Rd[tn] \times Rd[tn-1]) \quad (13)$$

During slower motions with closely spaced measurements averaging helps smooth out a choice of axis of rotation Ra where noise may cause Ra to have a random walk component.

This method also helps improve Ra at the stop and start of motions. Consider the original unweighted method as motion comes to a stop. Rd[t1] becomes smaller than Rd[t2], and if it is comparable to the noise, then both the axis to rotate Ra and the angle gamma are somewhat random, potentially causing large errors. The new cross-weighted method helps reduce the error in Ra by weighting to previous, larger Rd values, which follow the actual Ra more closely than the random effects induced by the more recent small Rd measurements. A similar weighting to the more important larger motions happens as motion is just starting out, as well.

Additional weighting can be applied to emphasize more recent measurements:

$$Ra[t1] = (a1 \cdot Rd[t2] \times Rd[t1] + a2 \cdot Rd[t3] \times Rd[t2] + \ldots a(n-1) \cdot Rd[tn] \times Rd[tn-1]) \quad (14)$$

B-Ra Plane Normal Calculation of Gamma

Another source of error is the error in the rotation angle gamma which is somewhat random when Rd is comparable to the noise. One embodiment employs a simple threshold filter—if Rd is small enough, a filter sets gamma to zero to avoid unwanted rotations.

A more comprehensive embodiment calculates cross-weighted Ra rotation axis to find the angle rotated between B[t2] and B[t1] around Ra, rather than using the angle between Rd[t2] and Rd[t1]. In the absence of noise these two methods give the same result; in a noisy environment when Rd is small the Rd method is much more susceptible to noise.

First calculate the normals to the B-Ra planes:

$$Rn[t1] = B[t1] \times Ra[t1] \quad (15)$$

$$Rn[t2] = B[t2] \times Ra[t1] \quad (16)$$

Then find gamma:

$$\text{gamma}[t1] = a\cos(\text{dot}(Rnn[t2], Rnn[t1])) \quad (17)$$

where Rnn is the normalized version of Rn:

$$Rnn = Rn/\text{magnitude}(Rn)$$

Summary of method using the two enhancements for finding Ra & gamma:

For a rotation on a fixed axis over 5 B readings (n=4), calculate the rotation from B[t2] to B[t1]:

$$Rd[t1] = B[t0] - B[0]; Rd[t2] = B[t1] - B[t2] \quad (18)$$

$$Ra[t1] = (a1 \cdot Rd[t2] \times Rd[t1] + a2 \cdot Rd[t3] \times Rd[t2] + a3 \cdot Rd[t4] \times Rd[t3]) \quad (19)$$

$$Rn[t1] = B[t1] \times Ra[t1]; Rn[t2] = B[t2] \times Ra[t1] \quad (20)$$

$$\text{gamma}[t1] = a\cos(\text{dot}(Rnn[t2], Rnn[t1])) \quad (21)$$

$$Tri[t1] = \text{rotation matrix}(Ra[t1], \text{gamma}[t1]) = \text{rotation matrix for rotation of } B[t2] \text{ to } B[t1] \quad (22)$$

Update the estimated accelerometer vector based on Tri rotation:

$$Gesti[t1] = Tri[t1] \cdot Gi \quad (23)$$

Dead Zone

Figure 4A:
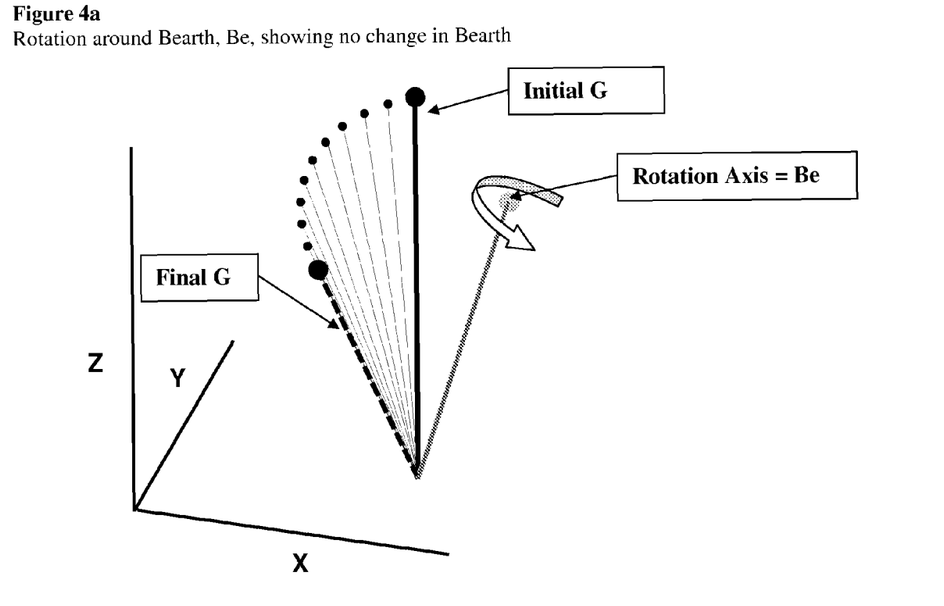
FIG. 4a Rotation around Bearth showing no change in Bearth.

One situation where the earth field B does not serve as a good reference is in the case where the compass rotates around B, as shown in FIG. 4a. In this case, even without motion corruption, G changes and B does not.

Figure 4B:
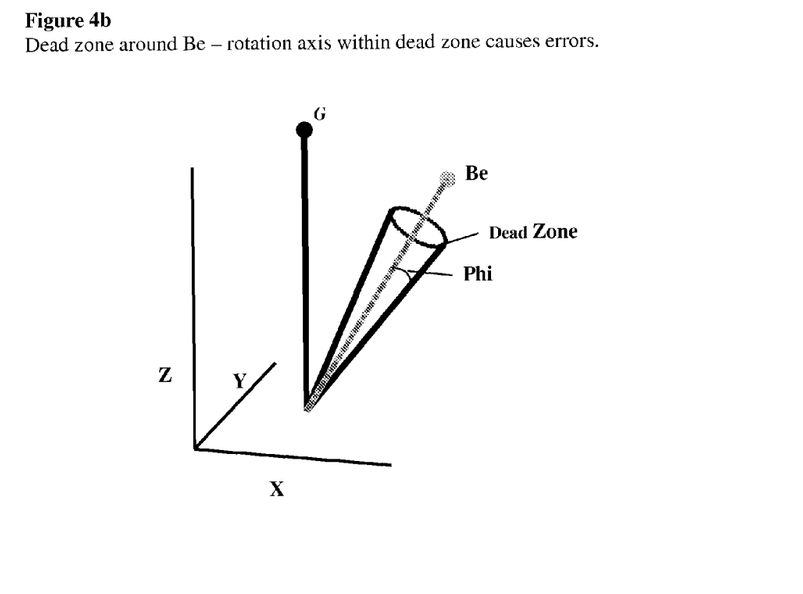
FIG. 4b Dead zone around B-rotation axis within dead zone causes errors.

For rotation motions around B, additional information is required to fully define a tilt change. However, with ideal data, such as perfect resolution, zero noise, a rotation is only a problem if it is aligned perfectly with B. Real world applications experience a "dead zone", defined by resolution, noise, and accuracy requirements, as shown in FIG. 4b. Compass rotation motion within phi, φ, degrees of B, within the dead zone, are then the only condition requiring additional information to meet the accuracy requirement.

Selection of Gi

There are several techniques that can be employed to incorporate accelerometer measurements Gmeas into the estimated Gest. A user could select Gi by pressing a button when the device is not moving, or the device could set Gi when contact with a GPS network is lost. The processor may also use a combination of one of more constraints to determine the fitness of the incoming Gmeas signal, and using fitness to adaptively process incoming measurements to correct a best estimate Gesti. Optionally, one constraint is the magnitude of G is always equal to 1 g.

$$Magnitude(G) = 1.0 \text{ g} \qquad (24)$$

Additional accelerations will cause the overall acceleration magnitude to deviate from its nominal value of 1.0 g as seen by a combination of the xyz components of accelerometers:

$$Magnitude(Gmeas) \neq 1.0 \text{ g} \qquad (25)$$

Another optional constraint is that an angle of inclination (dip-angle) and magnitudes of G and B will be a constant under rotations, this can be computed as the cross product:

$$cross(Gmeas, B) = Const. \qquad (26)$$

Other information that can be used to determine tilt-compensation include:

Rotation of earth magnetic field must be consistent with indicated tilt. The earth field provides a solid relative reference since the last clean acceleration tilt reference. Start with a known good G reading Gi.

Another optional constraint is to mathematically analyze raw acceleration data to separate spurious acceleration information from gravity tilt information.

Another optional constraint is to require that an acceleration calculation must be consistent with the earth field rotation. Trace the rotation of Gi based on how B has rotated. Dynamically interpret the G history to remove acceleration distortions.

Another optional constraint is to apply weighting to recent accelerometer readings to provide direct reference to accelerometers.

Additionally, to enable better accuracy, measurement timing enhancements such as timing interpolation are advantageous.

One embodiment employs an algorithm to create a "reference horizon", as determined by periodically monitoring up to three accelerometers during relatively inactive periods when accelerometer readings are not in error. During these "quiet times" a long term filter resets a reference horizon, which defines the last-known undistorted measurement of the orientation of the device; this can be seen as resetting the pitch & roll. Subsequent orientation changes are tracked exclusively through changes in the magnetic field vector direction until the next quiet reset period. Optionally, a reset period is implemented as a weighted filter with higher weight given if there is less movement detected.

Overall Algorithm Implementation

There are a number of elements to combine into an overall estimate of true G:

1) a known good G at some previous time;

2) a series of magnetometer measurements, Bmeas, and the associated series of distorted accelerometer measurements, Gmeas;

3) a rotation matrix based on B tracing back to Gi thru Gesti;

4) a dynamic interpretation of G history to remove acceleration distortions;

5) several constraints on how G may have rotated. It is possible to assemble all these components into one equation that provides an accurate estimate of G even with acceleration distortions present.

$$Gest[tn] = (a0 \cdot Tri0[tn] \cdot Gesti0[tn+1] + a1 \cdot Tri1[tn] \cdot Gesti1[tn+1] + \ldots) + (b \cdot Gestg[tn]) + (c0 \cdot G[tn] + c1 \cdot G[tn+1] + c2 \cdot G[tn+2] \ldots) + (d0 \cdot Gest[tn] + d1 \cdot Gest[tn+1] + d2 \cdot Gest[tn+2] \ldots) \qquad (27)$$

where:

Gest Final best estimate for the true G

Gesti Estimate of G based on rotation of B from the time of the initial "good" reading of G. Coefficients am (a0, a1 ...) weight Gestim based on how good each initial Gim is considered to be.

Gestg Estimate of current G based on dynamic analysis of G history to remove acceleration distortions, with consideration of the constraints of dip angle and that earth's gravity always equals 1.0 g. Coefficient b is weighted according to how good Gestg is considered relative to the other equation inputs.

cm Weighted coefficients for most recent G readings, weighted higher if there is less distortion present. This weighting keeps some level of direct reference to direct measured acceleration.

dm Weighted coefficients for most recent Gest outputs. This can be considered a recursive weighting which emphasizes past history.

In an embodiment with a two axis magnetometer and a two axis accelerometer, three dimensional vectors Bmeas and Gmeas, are obtained by using techniques taught in the cited references, or by combining the four measured quantities with the system of equations provided by at least two of the following three constraints: the magnitude of the magnetic field vector, Bmeas, is equal to the magnitude of B; the magnitude of the gravitation vector, Gmeas, is equal to 1 g; the dip angle remains constant.

In an embodiment with a two axis magnetometer and a three axis accelerometer, a three dimensional vector Bmeas is obtained by using techniques taught in the cited references, or by combining the measured quantities with the system of equations provided by the following constraints: the magnitude of the magnetic field vector, Bmeas, is equal to the magnitude of B; and the dip angle remains constant. Gmeas can be obtained from the accelerometer measurements.

In an embodiment with a three axis magnetometer and a two axis accelerometer, a three dimensional vector Gmeas is obtained by using techniques taught in the cited references, or by combining the measured quantities with the system of equations provided by the following constraints: the magnitude of the gravitation vector, Gmeas, is equal to 1 g; and the dip angle remains constant. Bmeas can be obtained from the magnetometer measurements.

In an embodiment a first sequence of data in time from two or more magnetometers, Bmeas, is acquired and a second sequence of data in time from two or more accelerometers, Gmeas, is acquired. Upon starting the system for the first time, Gest, the estimate of G will be taken to be Gmeas.

Bmeas is then, optionally, processed through a signal conditioning functional block comprising standard digital filters designed to reduce measurement noise and system noise in the raw signal.

Gmeas is, also optionally, processed through a signal conditioning functional block comprising standard digital filters designed to reduce measurement noise and system noise in the raw signal.

Bmeas, after optional conditioning, is then used to determine a rotation matrix, Rmagest, or a quaternion, or a rotation axis and an accompanying angle, as described in cited references, and earlier in this specification. Optionally, Rmagest may be determined from a least squares fitting procedure for a set of data points to be rotated into a subsequent set of data points. This rotation matrix can then be applied to Gest to obtain Gmagest.

$$Gmagest = Rmagest * Gest \quad (28)$$

Gmeas, after optional conditioning, may, optionally, be extrapolated forward in time to synchronize with Gmagest, gives Gaccest. The confidence of Gaccest, Gacc_conf, is determined by taking the standard deviation of magnitudes of a number of the most recent Gmeas points.

$$Gacc\_conf = 1/(1 + \text{standard deviation of magnitudes of recent } Gmeas) \quad (29)$$

Optionally, other techniques to determine Gacc_conf may be employed, such as comparing the recent magnitudes with 1 g, or by comparing the difference of Gmagest and Gaccest. One may also use a confidence of the magnetometer estimate.

$$Gmag\_conf = 1/(1 + \text{residual of Least Squares fit}) \quad (30)$$

Gest, is then calculated by combining Gmagest and Gaccest based on Gacc_conf.

$$Gest = Gacc\_conf * Gaccest + (1 - Gacc\_conf) * Gmagest \quad (31)$$

In an embodiment used for compassing, Gest and B are combined using tilt compensated compassing techniques to output corrected Heading, Pitch, and Roll angles.

In an embodiment Gest and Gmeas are used to compute NGA, where $$NGAcalc = Gmeas - Gest \quad (32)$$

The embodiment may output Gest, B, and NGA which may be used in combination with an initial position (obtained from, for example, GPS) and an initial velocity (obtained from, for example, a speedometer, or alternatively starting from rest) to determine both orientation (Heading, Pitch, and Roll) as well as velocity by integration NGA, and position by integrating velocity.

$$Velocity(t) = \left( \int_0^t NGA(t')\,dt' \right) + Velocity(0) \quad (33)$$

$$Position(t) = \left( \int_0^t Velocity(t')\,dt' \right) + Position(0) \quad (34)$$

Figure 7:
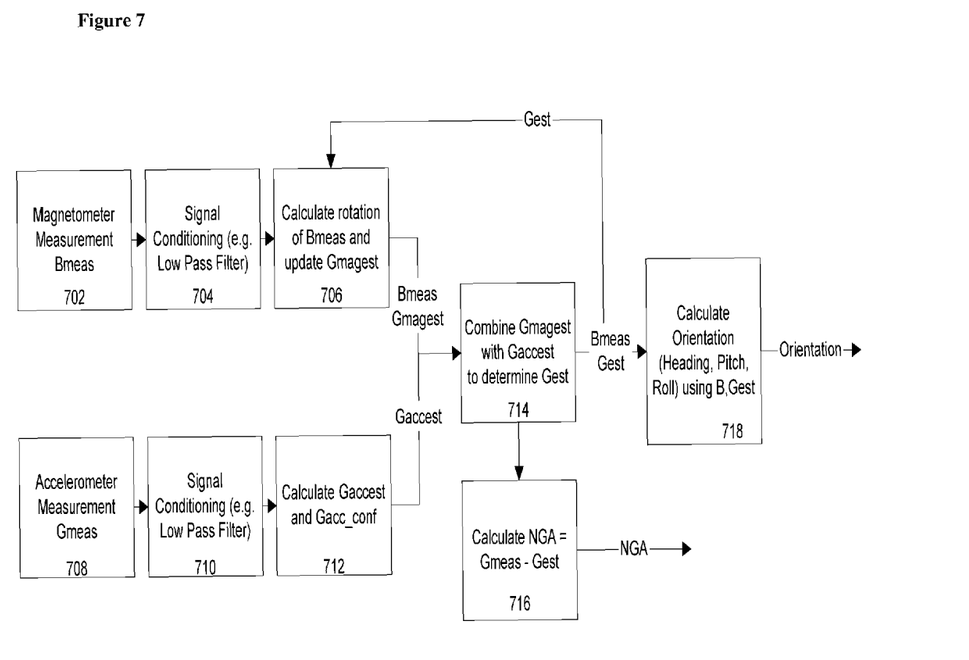
FIG. 7 Block Diagram of a tilt compensated compass processing data.

FIG. 7 shows an exemplary block diagram of a tilt compensated compass, also referred to as a position sensing device or an instrument for calculating a vector acceleration of gravity, G, in an ambient magnetic field, processing data. Block 702 shows a magnetometer measurement and outputs Bmeas, which is passed through signal conditioning block 704. Block 706 determines a rotation matrix, Rmagest, or a quaternion, or a rotation axis and an accompanying angle, as described in cited references, and earlier in this specification and then applies the rotation matrix as in equation 28 to obtain Gmagest. Block 708 of FIG. 7 shows an accelerometer measurement and outputs Gmeas, which is passed through signal conditioning block 710. Block 712 determines Gaccest from equation 29 and Gacc_conf from equation 31. Block 714 determines Gest using equation 31. Block 716 determines NGA from equation 32. Block 718 calculates Heading, Pitch and Roll from B and Gest.

Distortion Flag

Monitoring "measured G", Gmeas, over a period of time provides some information about levels of distortion present, deviations of magnitude and dip angle, for instance. As has been discussed, some distortions can be removed with dynamic motion correction or additional algorithms, or weighting can be applied to reduce the influence of distortions; optionally, a combination of more than one method is employed. However, at some level of distortion, either in magnitude or duration, orientation accuracy is degraded to the point that the orientation output is questionable or outside a range of utility at that point a "G distortion flag" may be used to notify a user that orientation accuracy is no longer meeting a particular threshold or range. A distortion flag may take the form of a signal or state from a means for processing to a means for communicating to a user wherein an electrical signal or state is converted to an audio or visual or tactile signal for the user's information. Alternatively a distortion flag may initiate an algorithm to compensate a heading or initiate other functions of utility to a user.

Magnetic Field Distortions

The discussion about removing or reducing distortions in G assumes that the earth's magnetic field, B, is a constant reference which is helpful in limiting the effect of G distortions. However, if B=B+Bdist, where "Bdist" is an additional magnetic field from local gradients or transients, then the assumption of a pure undistorted B field is not valid.

In the general case of a distorted B, many of the same techniques of using B to correct G distortions can be applied in a similar fashion to using G to correct B distortions. For instance, as has been stated previously, an angle of inclination (dip-angle) and magnitudes of G and B is a constant under rotation, so if G is not distorted too much then G can serve as a reference for B when B is distorted, just as B can serve as a reference for G when G is distorted.

Combination Algorithm

An algorithm correcting both B and G under distortion is disclosed; the algorithm applies weighting, to either B or G depending on which measurement has less distortion effects. A Kalman type model seamlessly combines B and G in a way that utilises the strengths of each.

Path Tracing

The instant invention discloses techniques of correcting distortions by using the rotation of one vector (B) as a reference for correcting the rotation error of another vector (G); optionally (G) as a reference for (B); optionally, combinations of (B) and (G) for alternatively correcting the other. There is another approach which gleans additional correction capability by looking at different information present in the data stream.

As distortion presents itself in the data streams of G and B, the G and B readings follow separate paths. When there are sufficient indications that one of the paths is caused by a distortion then the paths can be traced over time to give more information about removing the distortion and following the trace back to its proper place before the distortion presented itself, yet taking into account any rotations that have occurred during the distortion. Indications of a distortion include a change in the dip angle or a change in G and/or B magnitude, as well as a path analysis to determine if B or G paths are consistent.

For instance, in the case where G is invariant, but B starts to change with components that are not direct rotations around G, then clearly a distortion is present in B. In general G will not be invariant, so a more complex analysis considering the paths of both B and G is required to extricate a B distortion from the path information.

For another example, consider when G traces a path which has components outward from the sphere, as well as tangential components. The outward components represent a distortion, whereas the tangential components, ideally, represent a rotation. Having knowledge of the path traveled gives more information to separate out tangential and outward components than looking at a single set of readings.

Measurement Timing

Figure 5:
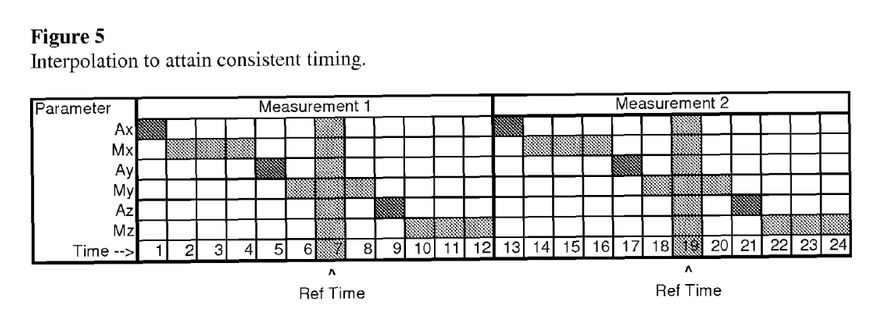
FIG. 5 Interpolation to attain consistent timing.

When six sensors are sampled sequentially, timing discrepancies among the six measurements may cause errors; a dynamic motion algorithm is more effective with control of the timing. This can be accomplished by interpolating all measurements to a same point in time. In one embodiment timing interpolation is done as follows: pick a measurement as a reference time and interpolate all other measurements to match the reference time. FIG. 5 shows how this linear interpolation is done in one embodiment, with each of the sensor measurements interpolated in time to time slot 7, where My is measured; My itself needs no interpolation. Optionally, a different reference time may be chosen, if desired. In one embodiment an interpolation is a linear interpolation, independently along each of the axes of measurement. For instance, interpolation is performed on Ax by interpolating in time between Ax1 and Ax2 to the reference time; optionally a non-linear interpolation may be chosen; optionally a weighted interpolation may be chosen.

The instant invention discloses multiple useful constraints on determining the tilt in a dynamic motion environment:

The instant invention may be a subsystem in a more complex navigation system comprising GPS, sonar systems, laser signals, or other means known to one knowledgeable in the field. When a GPS apparatus is present the longitude and latitude data it provides may be combined with tables and/or algorithms to calculate the declination angle and inclination angle for that spot on the globe.

A tilt compensated magnetic compass or position sensing device or an instrument for calculating a vector acceleration of gravity, G, in an ambient magnetic field may comprise one or more processors, ASIC's, memory chips and other integrated circuits as required to function as a means for processing and/or as a means for calculating and/or as a means for acquiring and storing sensor signals and calculating a tilt compensated heading and/or position orientation comprising rotation axis error and/or NGA. A tilt compensated magnetic compass or position sensing device may comprise one or more memory storage means such as memory integrated circuits and/or hard disk devices as required to function as a means for acquiring and storing or retaining at least two or more sets of sensor signal data. A tilt compensated magnetic compass or position sensing device or an instrument for calculating a vector acceleration of gravity may comprise one or more communication means such visual, audio, tactile, electronic, wireless, RF, USB or others known to one knowledgeable in the art. A tilt compensated magnetic compass or position sensing device or an instrument for calculating a vector acceleration of gravity may comprise one or more means to communicate with and/or process data from a global positioning satellite, GPS, system. The term magnetometer comprises various magnetic sensors such as Magneto-Inductive (MI), Magneto-Resistive (MR), Flux-gate, SQUIDs, Hall effect, or others known to one knowledgeable in the art; the term accelerometer comprises various types of motion sensors such as MEMS accelerometers, fluidic inclinometers, or other known to one knowledgeable in the art.

In one embodiment a method for calculating the vector acceleration of gravity, G, in an ambient magnetic field comprises the steps: acquiring a first sequence of data in time, Bmeas, from two or more magnetometers and a second sequence of data in time, Gmeas, from two or more accelerometers; calculating changes in orientation from Bmeas wherein the ambient magnetic field is used as a rotation reference; and processing the calculated changes in orientation with Gmeas to calculate the vector acceleration of gravity, G. Optionally, additional steps may be added; for instance, the step: calculating an orientation Heading, Pitch and Roll based upon said first sequence of data in time, Bmeas and said vector acceleration of gravity, G. Optionally, the step: calculating non-gravitational components, NGA, of said measured acceleration vector based on said second sequence of data in time, Gmeas, and said vector acceleration of gravity, G, may be added. Optionally, the step: calculating a velocity by integrating said non-gravitational components, NGA, of said acceleration vector, G, in time, may be added. Optionally, the step: calculating a position by integrating the velocity in time, may be added. Optionally, the step: interpolating in time of said first and second sequences of data such that interpolated data correspond to first and second sequences of synchronized measurements; wherein the interpolating is done after said acquiring and before said calculating, may be added. Optionally, the steps: calculating the magnitude of said Bmeas from said first sequence of data in time, and determining the presence of magnetic distortions based upon changes in magnitude of said first sequence of data, Bmeas, may be added.

In one embodiment a method for calculating the vector acceleration of gravity, G, and a substantially undistorted magnetic field, B, in an ambient magnetic field comprises the steps: acquiring a first sequence of data in time from two or more magnetometers, Bmeas, and a second sequence of data in time from two or more accelerometers, Gmeas; first calculating changes in orientation using B as a rotation reference; processing the calculated changes in orientation with Gmeas to calculate G; second calculating changes in orientation using G as a rotation reference; and processing the calculated changes in orientation with Bmeas to calculate B. Optionally, the step: calculating magnetic distortions, Bdist, as the vector difference of said B and said Bmeas, may be added. Optionally, the steps: determining when said magnetic distortions, Bdist, exceeds a predetermined distortion flag; and generating a signal when Bdist, exceeds the distortion flag, may be added. Optionally, the step: calculating an orientation Heading, Pitch and Roll based upon B and G, may be added. Optionally, the step: calculating non-gravitational components, NGA, of the measured acceleration vector based on the second sequence of data from two or more accelerometers, Gmeas, and the vector acceleration of gravity, G, may be added. Optionally, the step: calculating a velocity by integrating the non-gravitational components, NGA, of the acceleration vector, G, in time, may be added. Optionally, the step: calculating a position by integrating the velocity in time, may be added. Optionally, the step: interpolating in time of the first and second sequences of data such that interpolated data correspond to first and second sequences of synchronized measurements; wherein the interpolating is done after the acquiring and before the first calculating.

In one embodiment an instrument for calculating a vector acceleration of gravity, G, in an ambient magnetic field comprises two or more magnetometers; two or more accelerometers; means for calculating; means for acquiring and storing a first sequence of data in time, Bmeas from the two or more magnetometers, and a second sequence of data in time, Gmeas from the two or more accelerometers; and an algorithm comprising signal conditioning, constraint setting and matrix calculation; such that the means for calculating is operative to calculate the vector acceleration of gravity, G. In some embodiments the instrument for calculating a vector acceleration of gravity the means for calculating is operative to calculate an orientation Heading, Pitch and Roll using the algorithm, the vector acceleration of gravity, G, and the Bmeas.

In some embodiments of an instrument for calculating a vector acceleration of gravity, an algorithm comprising signal conditioning, constraint setting and matrix calculation comprises appropriate adaptations of Equations (1) through (34) in exemplary sequences as shown in FIG. 7. In some embodiments an algorithm comprising constraint setting comprises at least one constrain from a group comprising:

a) the magnitude of G is equal to 1 g;

b) an angle of inclination (dip-angle) and magnitudes of G and B is a constant under rotations;

c) setting G equal to a known good reading Gi;

d) mathematically analyze raw acceleration data to separate spurious acceleration information from gravity tilt information;

e) require that an acceleration calculation be consistent with the earth field rotation;

f) apply weighting to recent accelerometer readings to provide direct reference to accelerometers;

g) assume how G may have rotated;

h) dynamic analysis of G history to remove acceleration distortions, with consideration of the constraints of dip angle and that earth's gravity always equals 1.0 g;

i) the magnitude of the magnetic field vector, Bmeas, is equal to the magnitude of B;

j) the magnitude of the gravitation vector, Gmeas, is equal to 1 g; and h) the dip angle remains constant across some period of time.

The foregoing described embodiments of the invention are provided as illustrations and descriptions. They are not intended to limit the invention to a precise form as described. In particular, it is contemplated that functional implementation of invention described herein may be implemented equivalently in hardware and/or various combinations of hardware and software and/or other available functional components or building blocks. Other variations and embodiments are possible in light of above teachings to one knowledgeable in the art, and it is thus intended that the scope of invention not be limited by this Detailed Description, but rather by Claims following.

What we claim:

1. A method for an orientation measuring instrument to transform magnetic and acceleration data in an ambient magnetic field into the vector acceleration of gravity, G, comprising the steps:

acquiring a first sequence of data in time, Bmeas, from two or more magnetometers sensing the ambient magnetic field and a second sequence of data in time, Gmeas, from two or more accelerometers sensing local accelerations wherein the two or more accelerometers are operable with the two or more magnetometers;

processing changes in orientation from Bmeas wherein the ambient magnetic field is used as a rotation reference; and processing the changes in orientation with Gmeas wherein a rotation matrix is determined from Bmeas and applied to Gmeas such that the result is the vector acceleration of gravity, G.

2. The method of claim 1 further comprising the step:
processing said first sequence of data in time, Bmeas and said vector acceleration of gravity, G, such that the result is an orientation Heading, Pitch and Roll.

3. The method of claim 1 further comprising the step:
processing said second sequence of data in time, Gmeas, and said vector acceleration of gravity, G such that the result is the non-gravitational components, NGA, of said sensed accelerations.

4. The method of claim 3 further comprising the step:
processing said non-gravitational components, NGA, of said acceleration vector, G, in time such that the result is a velocity of said orientation measuring instrument.

5. The method of claim 4 further comprising the step:
processing the velocity in time such that a position of said orientation measuring instrument is determined.

6. The method of claim 1 further comprising the step:
interpolating the first and second sequences of data in time such that the interpolated data of the first and second sequences of data in time correspond to first and second sequences of synchronized measurements; wherein the interpolating is done after the acquiring of Bmeas and Gmeas and before the processing of changes in orientation from Bmeas and the processing of changes in orientation with Gmeas.

7. The method of claim 1 further comprising the steps:
processing said first sequence of data in time such that the magnitude of said Bmeas is determined; and
determining the presence of magnetic distortions based upon changes in magnitude of said first sequence of data, Bmeas.

8. A method for an orientation measuring instrument to transform acquired data into the vector acceleration of gravity, G, and a substantially undistorted magnetic field, B, in an ambient magnetic field comprising the steps:

acquiring a first sequence of data in time, Bmeas, from two or more magnetometers sensing the ambient magnetic field and acquiring a second sequence of data in time, Gmeas, from two or more accelerometers, sensing local accelerations wherein the two or more accelerometers are operable with the two or more magnetometers;

first processing changes in orientation using Bmeas as a rotation reference;

second processing the changes in orientation with Gmeas to determine G;

third processing changes in orientation using G as a rotation reference; and fourth processing the changes in orientation with Bmeas to determine B.

9. The method of claim 8 further comprising the step:
processing the vector difference of said B and said Bmeas such that magnetic distortions, Bdist, is determined.

10. The method of claim 9, further comprising the steps:
determining when said magnetic distortions, Bdist, exceeds a predetermined distortion flag; and
generating a signal when Bdist, exceeds the distortion flag.

11. The method of claim 10 further comprising the step:
processing said B and said G such that an orientation Heading, Pitch and Roll of said orientation measuring instrument is determined.

12. The method of claim 8 further comprising the step:
processing said sensed local accelerations based on said second sequence of data from two or more accelerometers, Gmeas, and said vector acceleration of gravity, G, such that non-gravitational components, NGA, are determined.

13. The method of claim 12 further comprising the step:
processing said non-gravitational components, NGA, of said acceleration vector of gravity, G, in time such that a velocity of said orientation measuring instrument is determined.

14. The method of claim 13 further comprising the step:
processing said velocity in time such that a position of said orientation measuring instrument is determined.

15. The method of claim 8 further comprising the step:
interpolating said first and second sequences of data in time such that interpolated data correspond to first and second sequences of synchronized measurements; wherein the interpolating is done after said acquiring and before said first processing.

16. An instrument for processing data acquired in an ambient magnetic field such that a vector acceleration of gravity, G, is determined comprising:

two or more magnetometers sensing the ambient magnetic field;

two or more accelerometers sensing local accelerations wherein the two or more accelerometers are operable with the two or more magnetometers;

means for processing sequences of data and vectors and matrices as are acquired in an ambient magnetic field and by an accelerometer such that the vector acceleration of gravity, G, may be determined;

means for acquiring and storing a first sequence of data in time, Bmeas, from the two or more magnetometers, and a second sequence of data in time, Gmeas, from the two or more accelerometers; and wherein the means for processing comprises means for signal conditioning, constraint setting and matrix calculation; such that the means for processing is operative to determine the vector acceleration of gravity, G based upon a rotation matrix determined from Bmeas and applied to Gmeas.

17. The instrument of claim 16 wherein the means for processing is operative to determine an orientation Heading, Pitch and Roll of the instrument by transforming said vector acceleration of gravity, G, and said Bmeas.

* * * * *